(12) United States Patent
Yamaki

(10) Patent No.: US 6,654,002 B1
(45) Date of Patent: Nov. 25, 2003

(54) ELECTRONIC APPLIANCE AND OPERATION CONTROL METHOD THEREOF

(75) Inventor: Yoichi Yamaki, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/535,301

(22) Filed: Mar. 24, 2000

(30) Foreign Application Priority Data

Mar. 25, 1999 (JP) .......................... P. 11-082470

(51) Int. Cl.⁷ .................................................. G09G 5/08
(52) U.S. Cl. ...................... 345/157; 345/156; 345/160; 345/856
(58) Field of Search ................................ 345/156, 157, 345/856, 160, 169, 158, 857–862

(56) References Cited

U.S. PATENT DOCUMENTS 5,825,353 A * 10/1998 Will
6,128,012 A * 10/2000 Seidensticker, Jr. et al.

* cited by examiner

Primary Examiner—Matthew C. Bella
Assistant Examiner—Hau Nguyen
(74) Attorney, Agent, or Firm—Pearne & Gordon LLP

(57) ABSTRACT

A plurality of items and a cursor capable of clearly pointing out an item selected from these items are displayed on a display screen. These plural items are employed so as to select a function and to input a character. On a telephone directory registering screen used to enter a character, when a user depresses a determination switch under such a condition that a cursor 25 is located at a position of a direction indication 26 indicative of a switching position of a cursor mode, the cursor mode is switched. Thus, in response to an operation input of a cursor switch, such a condition that the cursor can be moved along the right/left direction is changed into another condition that the display item can be scrolled along the upper/lower direction. At this time, the direction indication 26 is switched in correspondence with the change in the cursor modes.

10 Claims, 7 Drawing Sheets

ELECTRONIC APPLIANCE AND OPERATION CONTROL METHOD THEREOF

BACKGROUND OF THE INVENTION

The present invention is related to an electronic appliance for selecting a plurality of functions and also for inputting a plurality of characters by such a manner that a plurality of items are displayed on a display unit such as a liquid crystal display device, and the displayed item is selected by a switch operation, and also related to an operation control method of this electronic appliance.

Conventionally, electronic appliances equipped with multi-function have been widely utilized in order that a plurality of functions are selected and a plurality of characters are entered when these electronic appliances are operated. That is, while a plurality of items made of characters such as characters and symbols are displayed on a display unit such as a liquid crystal display device, a desirable item is selected from these displayed items by operating a switch.

In compact electronic appliances, for instance, communication terminal apparatus known as wireless selective calling receivers, very cumbersome operations/manipulations are required so as to select various functions and/or input characters, since sizes of display units thereof are small and a total number of switches is limited.

The Unexamined Japanese Patent Application Publication No. Hei 8-79361 discloses one typical communication terminal apparatus. That is, this conventional communication terminal apparatus is equipped with the display unit and the operation keys. The display unit displays thereon various sorts of functional information as a plurality of items. The operation keys are employed so as to move the cursor for clearly pointing out which item is being selected from these plural items. When such an operation instruction is issued that the cursor is moved along the upper direction in response to the key operation under such a condition that the cursor is located at the uppermost item position on one page screen under indication, this cursor is caused to jump to the uppermost item of the preceding page screen.

Also, the Unexamined Japanese Patent Application Publication No. Hei 10-155020 discloses another conventional communication terminal apparatus equipped with the rotary type operator. This rotary type operator can be rotated (pivotably manipulated), and also can be depressed along the direction perpendicular to this rotation axis. In this conventional communication terminal apparatus, while the cursor positioned at any one of the plural items displayed on the display unit is moved in response to the rotation operation of the rotary operator, the information related to such an item corresponding to the present position of this cursor is displayed in response to the depression operation of this rotary operator. Furthermore, while the information related to the item is displayed, if the rotary operator is rotated, then this displayed information is returned to such a condition that a plurality of items are displayed.

Also, the Japanese Patent No. 2693929 discloses the wireless selective calling receiver equipped with the function setting switch. This function setting switch is provided with the menu switch for displaying the plural setting functions on the display unit, the read switch for selecting any one of these setting functions, and the review switch for determining the execution of the selected setting function. The setting functions displayed on the display unit contain such a menu capable of changing the setting function of the function setting switch. While using this menu, the respective setting functions of these function setting switches can be set/changed.

These conventional apparatuses are capable of readily selecting the displayed item from the plural items, and also capable of improving the operabilities thereof.

Very recently, while needs of compactness and low cost are made of electronic appliances, multi-function is required although a total number of actually operable switches cannot be increased but also a dimension of a display unit cannot be increased. Under such a circumstance, when a desirable function is selected and a character is entered by using a small number of switches, a very large number of switching operations are necessarily required. Thus, there is such a problem that very cumbersome operations should be carried out. In such a case that the arrangements of the respective structural elements are restricted since the manufacturing cost and dimensions and also designs of these electronic appliances are limited, so that a large number of switches and of touch panels can be hardly provided, if a large number of functions are available by manipulating a small number of switches, then operabilities of these electronic appliances would be deteriorated. In particular, a great improvement is required in the operabilities of compact electronic appliances.

In the conventional electronic appliance such as the above-explained communication terminal apparatus disclosed in the above-described Japanese Patent Application Publications, in such a case that the cursor is located at a desirable item among the plural items displayed on the display unit so as to select this desirable item, if this cursor is moved by manipulating either one switch or two switches, then the following switch operation is carried out. In response to the operation instruction of either the push-button type operation switch or the rotary type operator, the cursor position is moved in the one dimensional manner along either the upper/lower direction or the right/left direction in such a way that this cursor is sequentially moved over the selected items. More specifically, such an electronic appliance that the dimension of the display unit and a total number of switches are limited and also the arranging positions of these display unit and switches are restricted owns the following problems when the above-explained one-dimensional cursor movement is carried out with respect to these items. That is, a total manipulation number of these switches is considerably increased, and a very cumbersome operation is necessarily required in order to select the items displayed on the different screens.

SUMMARY OF THE INVENTION

The present invention has been made to solve the above-explained problems, and therefore, has an object to provide an electronic appliance and an operation control method thereof. That is, in the case that a plurality of items displayed on a display unit is selected so as to select a desirable function and/or input a character, the electronic appliance may have such a superior operability that a subject item can be quickly selected from a large number of items by a small number of switch manipulations even when a total number of switches is small.

To achieve the above-described object, an electronic appliance, as recited in Aspect 1, is featured by comprising: a display unit for displaying a cursor used to clearly point out a plurality of items and also an item selected from the plural items; a cursor switch used to move/instruct the cursor; a determination switch used to determine a selection/ instruction of a display item corresponding to a position of the cursor; and control means connected to the display unit, the cursor switch, and the determination switch, for switching a move mode of the cursor on the display unit in response to the operation input of the determination switch when the cursor is located at a specific switching position on the display unit.

Preferably, as recited in Aspect 2, when the cursor is located at the specific switching position on the display unit, the control means alternately switches two move modes of the cursor in response to the operation input of the determination switch.

Also, as recited in Aspect 3, the control means switches, as the move mode of the cursor, a move direction of the cursor with respect to the display item. Preferably, as recited in Aspect 4, the control means switches, as the move mode of the cursor, a move direction of the cursor with respect to the display item to a right/left direction and an upper/lower direction. Alternatively, as recited in Aspect 5, the control means switches, as the move mode of the cursor, a move of the cursor to either a right/left direction or an upper/lower direction, and also a scroll operation of the display item along a direction perpendicular to the cursor move direction.

Also, as recited in Aspect 6, the display unit further displays a direction indication for indicating either the move direction of the cursor or the scroll direction of the display item in correspondence with the move mode of the cursor. Preferably, as recited in Aspect 7, the direction indication is arranged as an item at the specific switching position.

Also, as recited in Aspect 8, the cursor switch is constituted by employing a rotary switch, and the rotary switch issues a move instruction of the cursor corresponding to the move mode of the cursor, or another move instruction used to scroll the display item in accordance with a rotating operation of the rotary switch.

A selective calling reception apparatus, as recited in Aspect 9 of the present invention, is featured by comprising: a display unit for displaying a cursor used to clearly point out a plurality of characters, or numerals, and a selected character or a selected numeral; a cursor switch used to move/instruct the cursor; a determination switch used to determine a selection/instruction of a display item corresponding to a position of the cursor; and control means connected to the display unit, the cursor switch, and the determination switch, for switching a move mode of the cursor on the display unit in response to the operation input of the determination switch when the cursor is located at a specific switching position on the display unit, whereby: a character is entered by the designation of the cursor.

A method for controlling operation of an electronic appliance, as recited in Aspect 10 of the present invention, is featured by comprising: a displaying step for displaying on a display unit, a plurality of items and a cursor used to clearly point out an item selected from the plural items; a cursor moving step for moving the cursor to a display item in response to a move instruction issued by a cursor switch; a selecting/determining step for selecting/determining a display item corresponding to a position of the cursor in response to a selecting/determining instruction of a determination switch; and a move mode switching step for switching a move mode of the cursor on the display unit in response to an operation input of the determining step when the cursor is located at a specific switching position on the display unit.

Preferably, as recited in Aspect 11, in the move mode switching step, when the cursor is located at the specific switching position on the display unit, two move modes of the cursor are alternately switched in response to the operation input of the determination switch.

Also, as recited in Aspect 12, in the move mode switching step, as the move mode of the cursor, a move direction of the cursor with respect to the display item is switched. Preferably, as recited in Aspect 13, in the move switching step, as the move mode of the cursor, a move direction of the cursor with respect to the display item is switched to a right/left direction and an upper/lower direction. Alternatively, as recited in Aspect 14, in the move mode switching step, as the move mode of the cursor, a move of the cursor is switched to either a right/left direction or an upper/lower direction, and also a scroll operation of the display item along a direction perpendicular to the cursor move direction.

Also, as recited in Aspect 15, the control method is further comprised of a direction displaying step for displaying on the display unit, a direction indication for indicating either the move direction of the cursor or the scroll direction of the display item in correspondence with the move mode of the cursor. Preferably, as recited in Aspect 16, the direction indication is arranged as an item at the specific switching position.

A selective calling reception apparatus, as recited in Aspect 17 of the present invention, is featured by comprising:
a displaying step for displaying on a display unit, a cursor used to clearly point out a plurality of characters, or numerals, and a selected character or a selected numeral; a cursor moving step for moving the cursor with respect to a display item in response to a move instruction of a cursor switch; a selecting/determining step for selecting/determining a display item corresponding to a position of the cursor in response to a selecting/determining instruction of a determination switch; and a move mode switching step for switching a move mode of the cursor on the display unit in response to an operation input of the determination switch when the cursor is located at a specific switching position on the display unit; whereby: a character is entered by the designation of the cursor.

In accordance with the electronic appliance, the operation control method of the electronic appliance, or the selective calling reception apparatus of the present invention, in the case that a plurality of items displayed on the display unit are selected so as to select a desirable function and/or input a character, when the cursor is located at a specific switching position on the display unit, the move mode of the cursor on the display unit is switched in response to the operation input of the determination switch. After this mode switching operation, the mode such as the move direction of the cursor is changed in response to the operation input of this cursor switch. Also, when the cursor is located at the specific switching position, the move modes of the cursor are alternately switched in response to the operation input of the determination switch. After this switching operation, when the operation input of the determination switch is again applied at the specific switching position, the move direction of the cursor and the scroll operation of the display item are returned to the original mode.

As a consequence, the cursor can be effectively moved to select a desirable display item from the plural display items. For instance, since the move direction of the cursor is switched to the right/left direction and the upper/lower direction, the move direction of the cursor is changed, and thus the cursor can be reached to a subject display item with a small number of cursor manipulation procedures. Since the operation mode of the cursor is switched between either the cursor movement along the upper/lower direction or the right/left direction, and the scroll operation of the display item along the direction perpendicular to this cursor movement direction, the move mode is changed from the cursor move to the scroll operation, so that the subject display item can be quickly displayed, and the cursor can be moved to this subject display item with a small number of cursor manipulation procedures.

Since such an operation is carried out, even when the cursor is moved by manipulating a small number of switches, a total number of the manipulation procedures related to the cursor movement can be reduced and the operability can be improved, as compared with such a case that, for instance, only the cursor is moved with respect to a plurality of display items, in the one-dimensional manner.

In such a case that the rotary switch is employed as the cursor switch and this rotary switch outputs the move instruction related to the cursor movement by way of the rotation operation thereof, since this rotary switch can produce the move instructions along dual directions by reversing the rotation direction of this rotary switch, the electronic appliance with the superior operability can be constituted by employing a small number of switches.

Also, in the display unit, such a direction indication is displayed. This direction indication indicates either the move direction of the cursor corresponding to the move mode of the cursor or the scroll direction of the display item. Then, this direction indication is switched in correspondence with the change in the cursor move modes. With employment of this direction indication, the user can readily grasp the present move direction of the cursor when the user manipulates the switch of this cursor. Thus, since the cursor can be quickly moved along a desirable direction, the erroneous operation can be avoided and also the operability can be improved. Also, while the direction indication is employed as the item located at a specific switching position and furthermore may have both functions, namely the item indicative of the switching position and the direction indication, it is possible to arrange the display items on the display screen of the display unit in a higher efficiency. Also, the operability of the electronic appliance can be improved and the electronic appliance can be made compact.

DETAILED DESCRIPTION OF THE PREFERRED EMBODIMENTS

Referring now to drawings, an embodiment mode of the present invention will be described.

Figure 1:
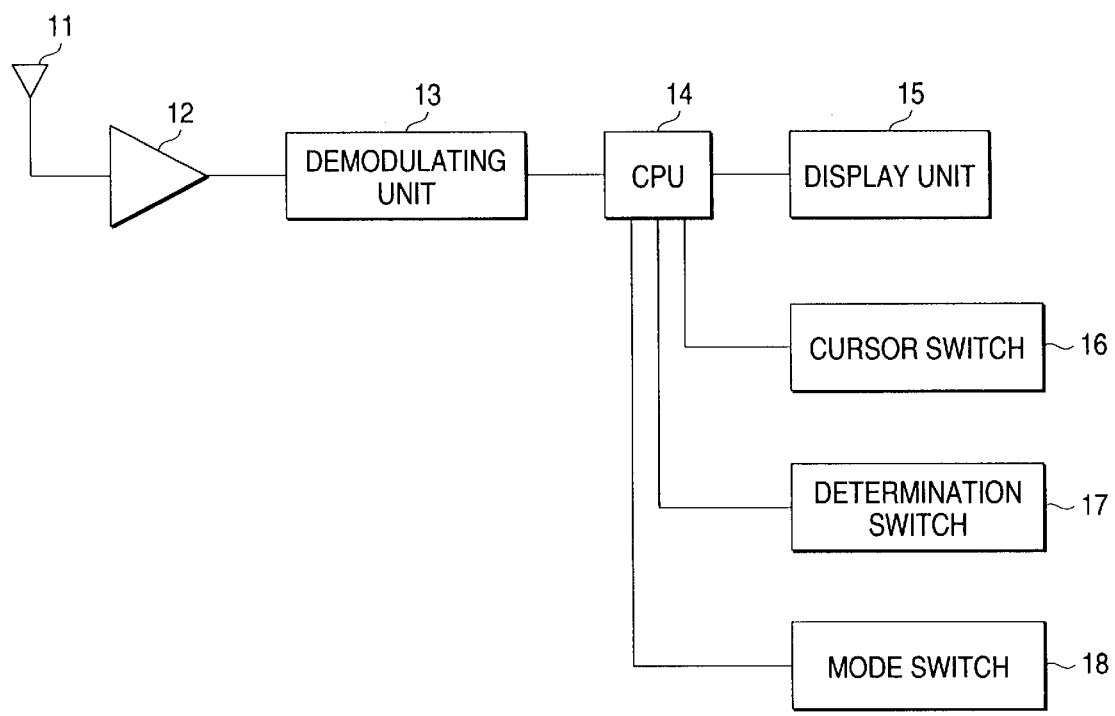
FIG. 1 is a block diagram for indicating an arrangement of a wireless selective calling receiver as one embodiment mode of the present invention.

FIG. 1 is a schematic block diagram for showing an arrangement of a wireless selective calling receiver according to an embodiment mode of the present invention. In this embodiment mode, a description will now be made of such a case that an arrangement of an electronic appliance is applied to a wireless (radio) selective calling receiver belonging to one sort of a communication terminal apparatus.

The wireless selective calling receiver is arranged by employing an antenna 11, an amplifier 12, a demodulating unit 13, a CPU (central processing unit) 14, and a display unit 15.

The antenna 11 receives a wireless transmission signal transmitted from a base station. The amplifier 12 amplifies a selective calling signal received by the antenna 11. The demodulating unit 13 demodulates the transmitted selective calling signal. The CPU 14 may function as a control means for controlling an overall operation of this wireless selective calling receiver. The display unit 15 displays thereon a reception message contained in the demodulated selective calling signal, a plurality of items related to a selection of a function and an entry of a character, and further, a cursor for clearly pointing out a selected item from these plural items under control of the CPU 14. Also, this wireless selective calling receiver is provided with a cursor switch 16, a determination switch 17, and a mode switch 18. The cursor switch 16 is used to input a move instruction by which the cursor is moved so as to select the desirable item displayed on the display unit 15. The determination switch 17 is used to enter a selection determination instruction of the item selected by the cursor. The mode switch 18 is used to enter a screen switching instruction by which such a display screen as a waiting screen and a function selection screen is switched.

Figure 2:
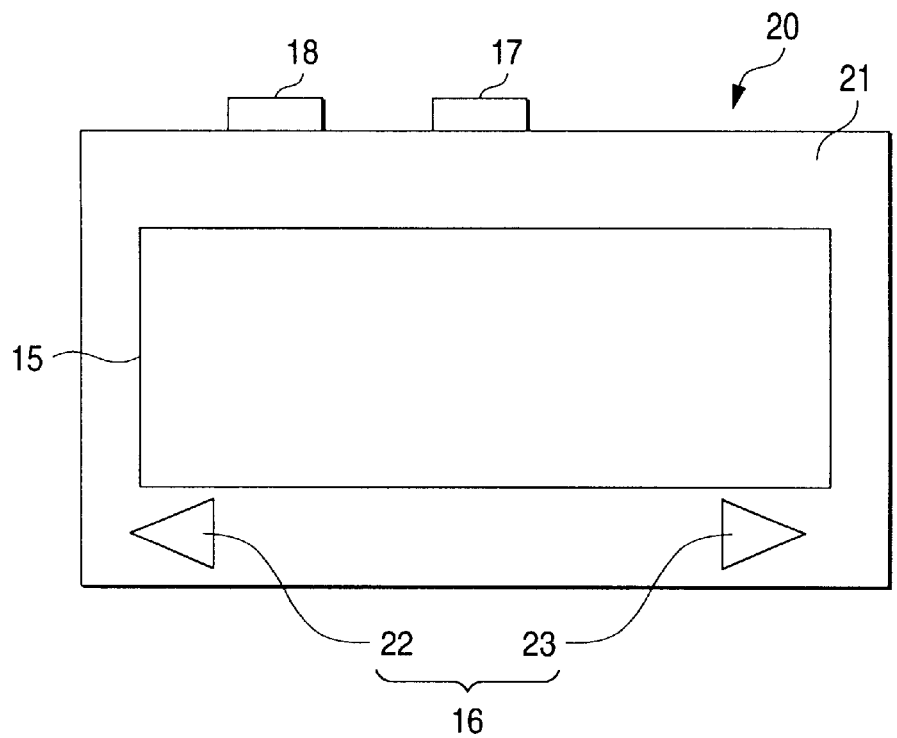
FIG. 2 is a plan view for showing an outer structural view of a first structural example of the wireless selective calling receiver.
Figure 3:
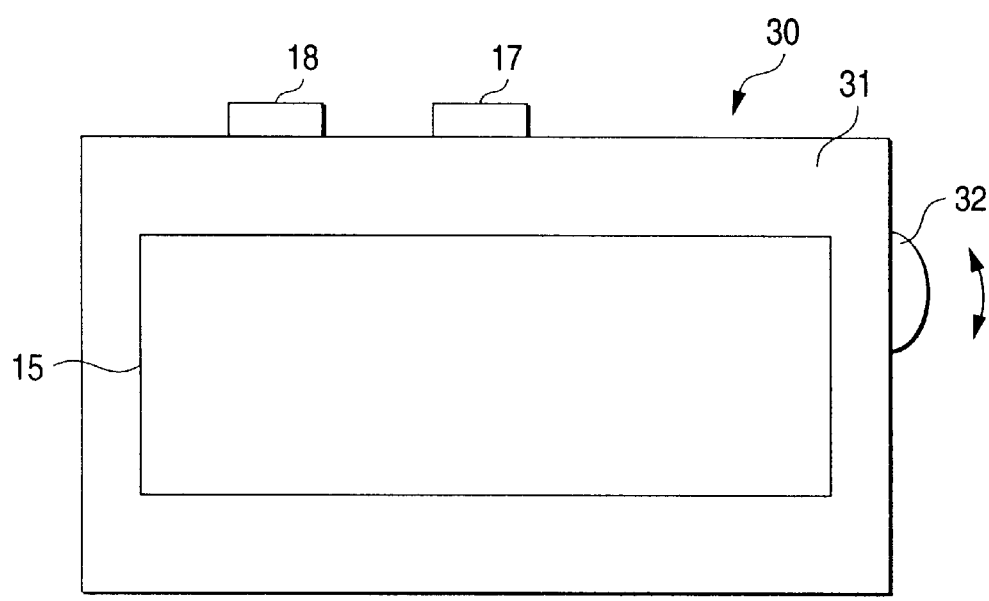
FIG. 3 is a plan view for showing an outer structural view of a second structural example of the wireless selective calling receiver.

FIGS. 2 and 3 are plan views for representing outer structures of wireless selective calling receivers. In a wireless selective calling receiver 20 shown in FIG. 2 as a first structural example, a display unit 15 is provided at a front surface portion of an apparatus main body 21. This display unit occupies a major portion of this front surface, and is constituted by a liquid crystal display and the like. Both the mode switch 18 and the determination switch 17 are arranged on an upper edge portion of the apparatus main body 21. Also, two sets of move instruction switches, namely a left direction switch 22 and a right direction switch 23 are arranged side by side on a lower portion of the display unit 15. These left direction switch 22 and right direction switch 23 may function as the cursor switch.

Also, in another wireless selective calling receiver 30 shown in FIG. 3 as a second structural example, the display unit 15, the mode switch 18, and the determination switch 17 are provided on an apparatus main body 31. Instead of the two move instruction switches, a rotary switch 32 is arranged on one side portion of the apparatus main body 31, as the cursor switch 16. This rotary switch 32 is constructed of a rotary operator such as a rotary encoder. Since the rotary switch 32 is rotated (pivoted) along the circumferential direction, this rotary switch 32 produces move instructions for two directions in response to rotation directions of this rotary switch 32. It should be understood that this rotary switch 32 may be operated to output operation instructions by way of the rotation manipulation and also the move manipulation along the radial direction, and thus this rotary switch 32 may have another function of the determination switch 17.

In the wireless selective calling receiver with employment of the above-described arrangement, the selective calling signal transmitted from the base station and then received by the antenna 11 is amplified by the amplifier 12, and thereafter demodulated by the demodulating unit 13. Then, the demodulation data derived from this demodulating unit 13 is analyzed by the CPU 14. The CPU 14 extracts address data containing a calling number, and also message data subsequent to this address data from the demodulation data of the selective calling signal so as to judge as to whether or not the selective calling signal is related to the calling number of the own station. When the calling number contained in the address data in the selective calling signal is made coincident with the calling number of the own station, the reception message is displayed on the display unit 15 based upon the message data.

Under control of the CPU 14, the display unit 15 displays thereon various display screens such as a waiting screen, a function selecting screen, and a telephone directory registering screen in response to an operation mode at this stage. On the waiting screen, a reception message, a reception message number, a time instant, and the like are displayed. On the function selecting screen, an item list for indicating various sorts of functions to be selected and also a cursor are displayed. On the telephone directory registering screen, both an item group and a cursor are displayed, which are used to enter a telephone number and a character such as a name in a telephone directory function. As a plurality of items displayed on the display unit 15, various sorts of characters containing a character, a character string, a symbol, and a figure are used to constitute these items, corresponding to the function selection and the character input, depending upon the sort of the display screen.

At this time, in response to either a screen switching instruction issued by the mode switch 18 or a selection determining instruction issued by the determination switch 17, the display screen of the display unit 15 is switched under control of the CPU 14. In such a case that the function is selected on the function selecting screen and the character is entered on the telephone directory registering screen, the position of the cursor with respect to the display item displayed on the display screen is moved under control of the CPU 14 in response to a move instruction input made by the cursor switch 16. It should be noted that as the move modes of the cursor, there are various move modes in which the display item and the cursor are relatively moved along a preselected direction, namely, a cursor move in which the position of the cursor itself is moved with respect to the array of the items, and a scroll operation in which the display position of the item is moved with respect to the cursor.

In other words, the CPU 14 owns such a control function, while detecting the operation inputs made by the cursor switch 16, the determination switch 17, and the mode switch 18. That is, the CPU 14 controls the switching operation of the display screen, the move operation of the cursor, and the selection determining operation on the display unit 15.

Next, a description will now be made of operations of the above-explained wireless calling receiver with respect to switch operations and cursor movement in the case that a plurality of functions are selected and a plurality of characters are entered. First of all, as a comparison example, in FIG. 4, there is shown operations and display screens in such a case that only the cursor is moved in the one-dimensional manner when the cursor is moved with respect to the display item.

Figure 4:
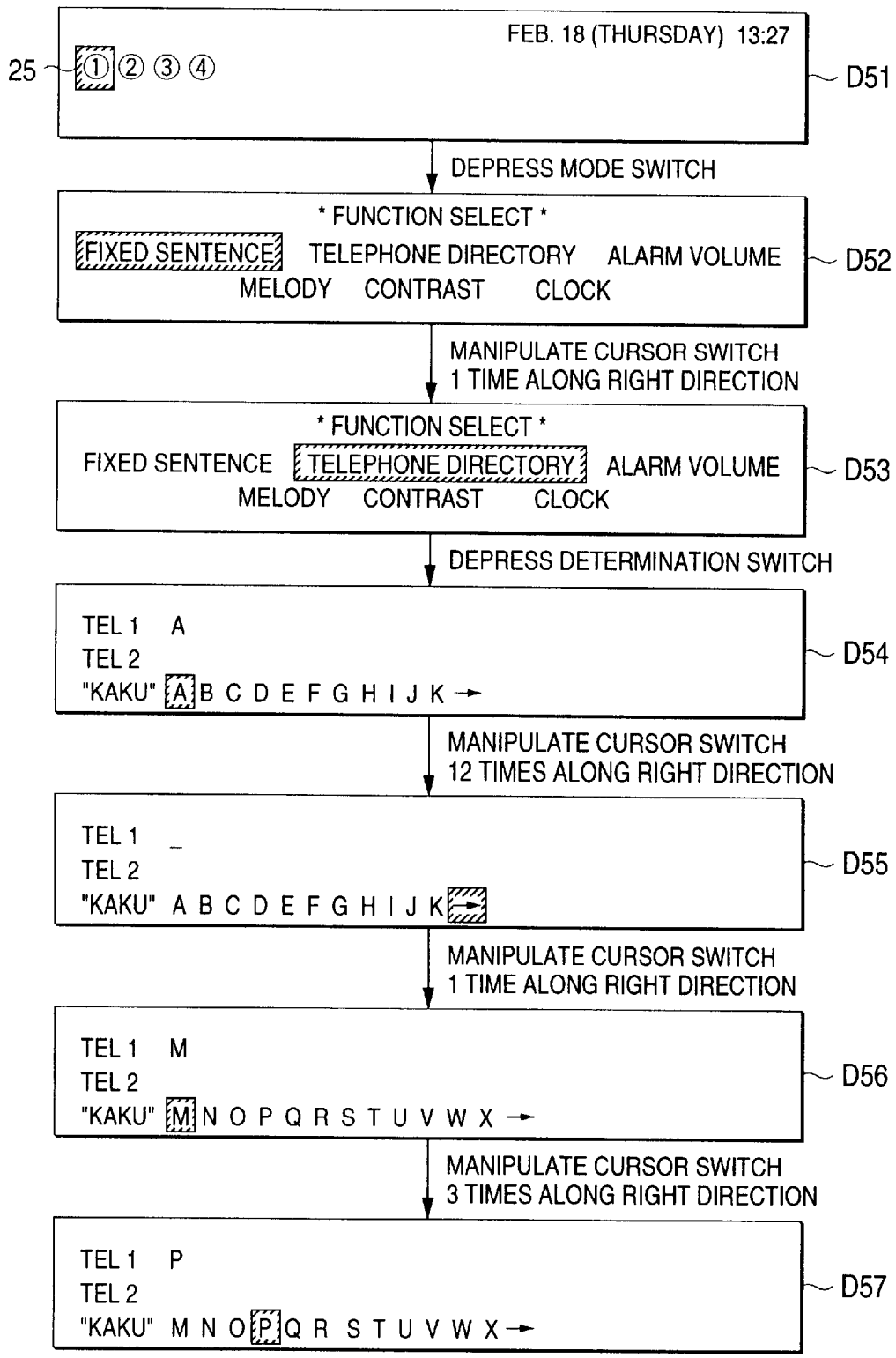
FIG. 4 is an explanatory diagram for showing operations and display screens related to switch manipulations and cursor movement when a plurality of functions are selected and a plurality of characters are entered in a comparison example.

In the operation of the comparison example, FIG. 4 represents operation stages after the telephone directory function corresponding to one of the functions of the wireless selective receiver is selected, until such a character as "P" is selected so as to enter a character on the telephone directory registering screen. In this operation, the description is commenced from a condition of a display screen D51 on the waiting screen which is displayed under normal reception message waiting condition.

On the display screen D51, when the user depresses the mode switch 18 is depressed, the present operation mode is advanced to a function selecting operation mode. In this function selecting operation mode, this display screen D51 is switched to a display screen D52 corresponding to a function selecting screen used to select the respective sorts of functions. In the respective display screens shown in this drawing, a cursor 25 is displayed. This cursor 25 clearly points out a presently selected display item. It should be noted that the shape of this cursor 25 is not limited to such a rectangular-shaped cursor capable of indicating a selecting position by changing a background color of a display item as shown in this drawing, but may be modified as follow: A cursor may be formed by reverse-indicating a selected display item, and another cursor may be formed by indicating a selected display item by using an underline.

On the function selecting screen, as various sorts of selectable functions, the items indicative of the following functions are displayed, namely, "fixed sentence (selection of fixed sentence)", "telephone directory (register of telephone directory)", "alarm (setting of alarm)", "sound volume (setting of sound volume such as alarm)", "melody (setting of melody used to notify reception)", "contrast (setting of contrast of display unit)", "clock (setting of time instant of clock)".

In the display screen D52, when the user issues the move instruction by manipulating the cursor switch 16 one time along the right direction, the cursor 25 is moved by one step as illustrated in a display screen D53, so that the telephone directory function is selected. The switch manipulation of the cursor switch 16 in this stage corresponds to the depression operation of the left direction switch 22, or the right direction switch 23 employed in the first structural example of FIG. 2, or corresponds to the rotation operation of the rotary switch 32 employed in the second structural example of FIG. 3.

In the case of the rotary switch 32, a right turn (clockwise rotation) of this rotary switch 32 corresponds to the right direction, whereas a left turn (counterclockwise rotation) thereof corresponds to the left direction. In this display screen D53 of the function selecting screen, when the user depresses the determination switch 17, the present operation mode is moved to the character input operation mode, and thus, this display screen D53 is switched to a display screen D54 of a telephone directory registering screen by which the user inputs a telephone number and a name to a telephone directory.

In the telephone directory registering screen, a registering information display area for displaying character information to be registered is provided, and a character string is displayed on the right side of "TEL1", of "TEL2". An item group is displayed on a lower portion of this registering information display area. In this item group, subjects of characters to be entered are arranged in an array shape. Also, "KAKU (Japanese character)" is displayed on a left end of the item group for these subject characters as an item which is selected when an entered character is defined.

In this display screen D54, when an alphabetical capital letter "P" is selected, the user sequentially moves the cursor 25 to a position of a display item "P" by manipulating the cursor switch 16. First, when the cursor 16 is manipulated 12 times along the right direction in the display screen D54 of the telephone directory registering screen, the cursor 25 is moved by 12 stages along the right direction to a position of such an item indicated by a right-directed arrow. When the user further manipulates the cursor switch 16 one time along the right direction under the condition of this display screen D55, the selecting screen of the alphabetical capital letters "A" to "L" indicated in the display screens D54 and D55 is switched to another selecting screen of alphabetical capital letters "M" to "X" as shown in another display screen D56.

In this display screen D56, when the user further manipulates the cursor switch 16 three times along the right direction, the cursor 25 is moved by 3 stages along the right direction and an alphabetical capital letter "P" is selected, as represented in the display screen D57.

In this comparison example, in order that the selecting screen of the alphabetical capital letters "A" to "L" indicated in the display screen D54 is switched to the selecting screen of the alphabetical capital letters "M" to "X" shown in the display screen D56, the user is required to manipulate the cursor switch 16, 13 times in total (namely, summation of 12 and 1 times). Furthermore, as indicated in the display screen D57, the user must manipulate the cursor switch 3 times until the display item "P" is selected. As previously explained, when the cursor is moved only in the one dimensional manner, the cursor switch manipulations must be carried out 16 times in total until the selection of the alphabetical capital letter "P" is accomplished only as to the manipulation of the cursor movement. Therefore, a very large number of switch manipulation procedures are required, resulting in very cumbersome operation.

Figure 5:
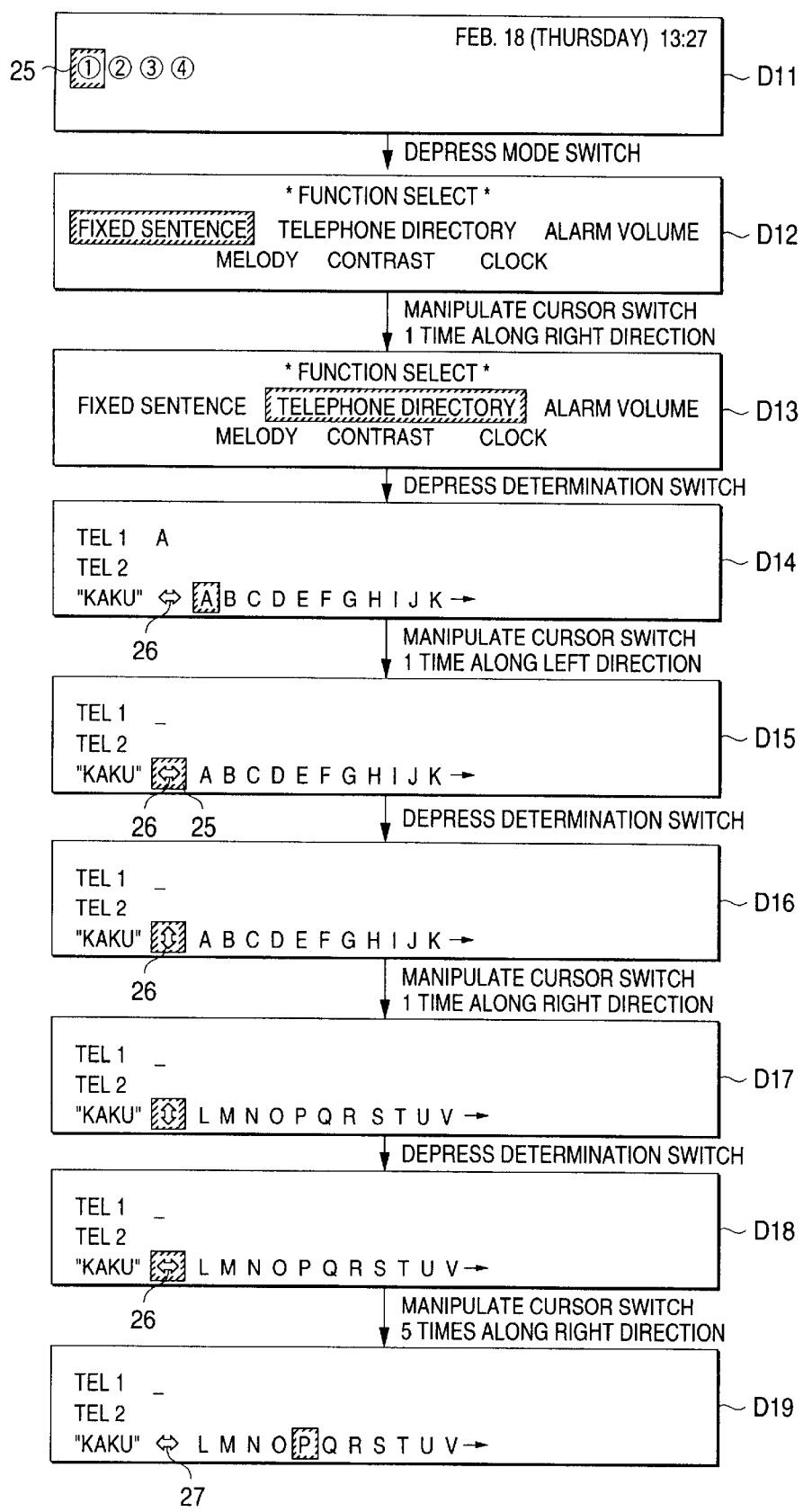
FIG. 5 is an explanatory diagram for showing operations and display screens related to switch manipulations and cursor movement when a plurality of functions are selected and a plurality of characters are entered in this embodiment mode.

Next, operations of the wireless selective calling receiver according to this embodiment mode will be described with reference to FIGS. 5 to 8. FIG. 5 is an explanatory diagram for explaining operations related to switch manipulations and cursor movement when a plurality of functions are selected, and a plurality of characters are inputted in this embodiment mode.

Figure 6A:
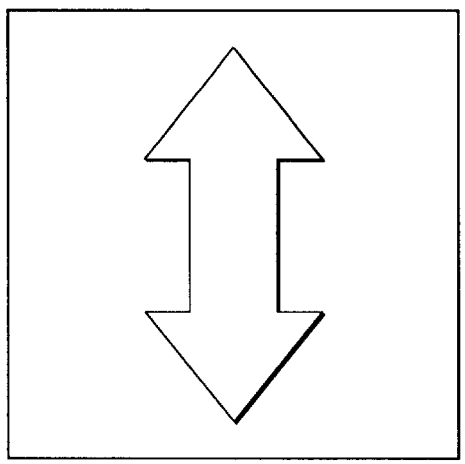
FIGS. 6A and 6B are explanatory diagram for explaining a direction indication 26 displayed on a display screen.
Figure 6B:
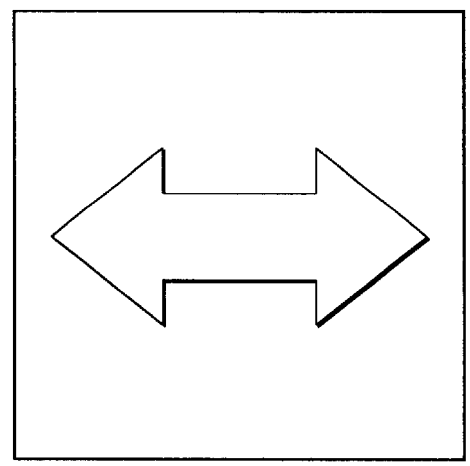
Figure 7:
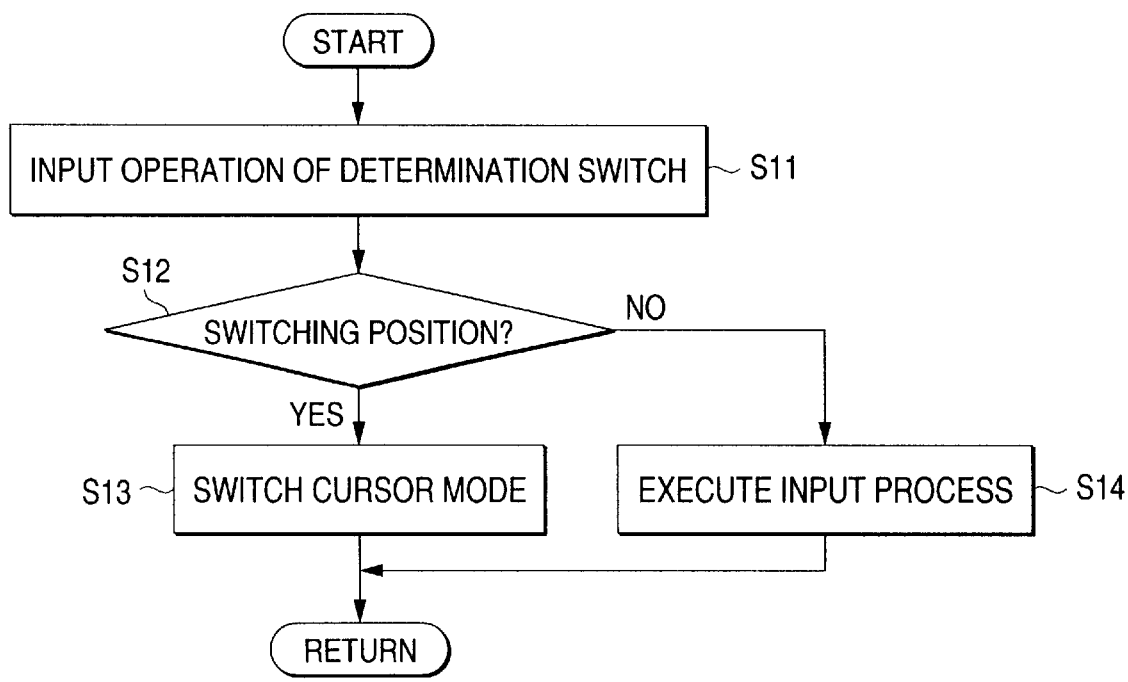
FIG. 7 is a flow chart for describing a process operation in such a case that a manipulation of a determination switch is entered.
Figure 8:
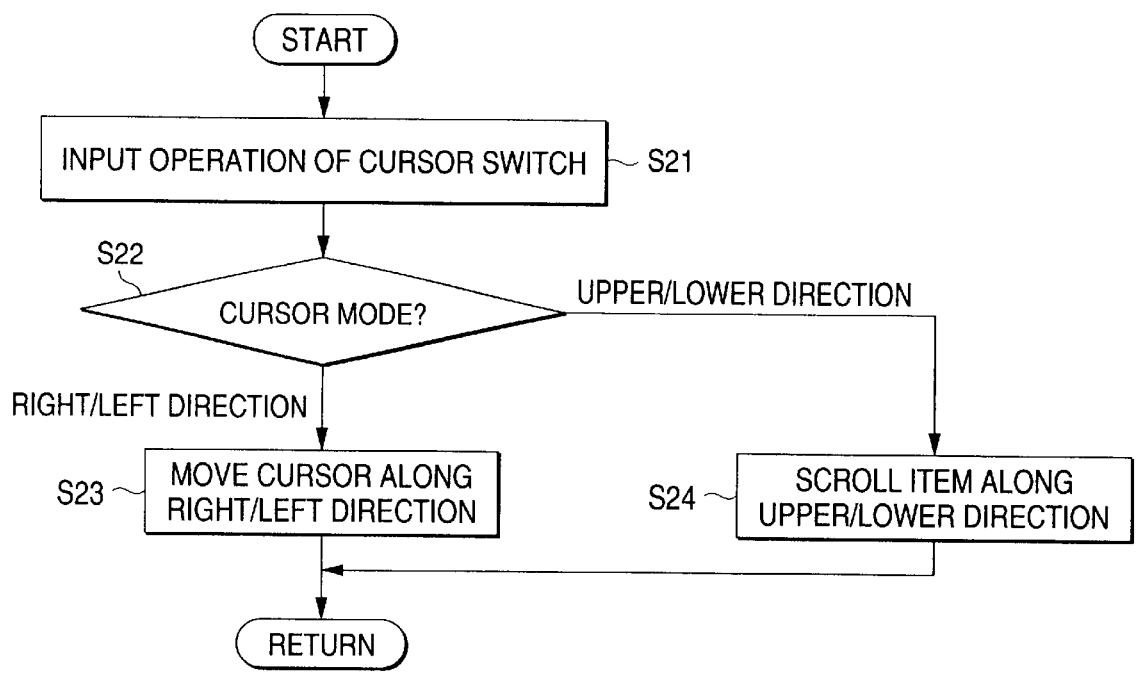
FIG. 8 is a flow chart for describing a process operation in such a case that a manipulation of a cursor switch is entered.

FIGS. 6A and 6B are explanatory diagram for explaining a direction indication displayed on a display screen. FIG. 7 is a flow chart for describing process operation executed when the determination switch is manipulated. FIG. 8 is a flow chart for describing process operation executed when the cursor switch is manipulated.

Similar to the comparison example of FIG. 4, FIG. 5 represents operation stages after the telephone directory function corresponding to one of the functions of the wireless selective receiver is selected, until such a character as "P" is selected so as to enter a character on the telephone directory registering screen. In this operation, the description is commenced from a condition of a display screen D11 on the waiting screen which is displayed under normal reception message waiting condition. It should be understood that the display screens D11 to D13 are similar to the above-explained display screens D51 to D53 of FIG. 5.

On the display screen D11, when the user depresses the mode switch 18, the present operation mode is advanced to a function selecting operation mode. In this function selecting operation mode, this display screen D11 is switched to a display screen D12 corresponding to a function selecting screen used to select the respective sorts of functions. In the display screen D12, when the user issues the move instruction by manipulating the cursor switch 16 one time along the right direction, the cursor 25 is moved by one step as illustrated in a display screen D53, so that the telephone directory function is selected. In this display screen D13 of the function selecting screen, when the user depresses the determination switch 17, the present operation mode is moved to the character input operation mode, and thus, this display screen D13 is switched to a display screen D14 of a telephone directory registering screen by which the user inputs a telephone number and a name to a telephone directory.

In accordance with this embodiment mode, on the telephone directory registering screen, such an item group that subjects of characters to be entered are arranged in an array shape is displayed, and also while a specific switching position is separately set, a function item indicative of this specific switching position is displayed. At this specific switching position, a move mode of the cursor (will be referred to as a "cursor mode" hereinafter) can be switched. In the example of FIG. 5, this function item is commonly used as a direction indication 26 for indicating a move direction of the cursor 25, and this function item is arranged at a left end of the item group of the character subject. Also, "KAKU (Japanese character)" is displayed as a definition item on the left adjacent position of the direction display 26, which is selected when the entered character is defined. It should be noted that the direction indication 26 indicates such a condition that the move direction of the cursor 25 corresponds to any one of the right/left direction and the upper/lower direction. Also, as illustrated in FIGS. 6A and 6B, this direction indication 26 is displayed as arrow pictures on the display screen.

To select such an alphabetical capital letter of "P" on this display screen D14, the user firstly manipulates the cursor switch 16 one time along the left direction. As a result, as illustrated on a display screen D15, the cursor 25 is moved by one stage along the left direction to be transported to a position of the direction indication 26. As shown in the display screen D15, under such a condition that the cursor 25 is located at a position of the direction indication 26 indicative of a switching position, when the user depresses the determination switch 17, the cursor mode is switched. In the example of FIG. 5, the control operation is changed in such a way that the move direction of the cursor is changed from the right/left direction to the upper/lower direction. In this case, it should also be noted that as to the cursor movement to the upper/lower direction, the cursor 25 itself is not moved, but the display position of the item is scrolled, so that the cursor 25 is relatively moved.

In other words, in accordance with this display mode, a plurality of items are arranged in the two dimensional manner (matrix shaped arrangement). When the cursor is moved so as to select a desirable item from a plurality of items, for instance, the cursor is not moved in the one dimensional manner such as only along the upper/lower direction. Instead, the move direction of this cursor maybe changed to either the right/left direction or the upper/lower direction. Accordingly, a total number of manipulation procedures related to the cursor movement can be reduced.

When the operation state is transferred from such a condition that the cursor 25 displayed on the display screen 15 is capable of being moved along the right/left direction into another condition that the cursor 25 is capable of being scrolled along the upper/lower direction since the cursor mode is switched, the direction of the direction indication 26 is changed from the right/left direction to the upper/lower direction as illustrated on a display screen D16. As a result, the user can readily recognize the move direction of the cursor.

As shown in this display screen D16, when the user manipulates the cursor switch 16 one time along the right direction under such a state that the cursor 25 can be scrolled along the upper/lower direction, the display item is scrolled along the upper/lower direction, and therefore, the selecting screen for selecting the alphabetical capital letters "A" to "K" can be moved to the selecting screen for selecting the alphabetical capital letters "L" to "V", although the cursor 25 has been so far moved along the right/left direction, as shown in a display screen D17.

When the user again depresses the determination switch 17 under such a condition that the cursor 25 is located at the position of the direction indication 26 as indicated on the display screen D17, the cursor mode is switched, and the direction indication 26 is returned to the original position as shown in the display screen D18. Then, the present condition is transferred to such a previous condition that the cursor 25 can be moved along the right/left direction. In other words, while the cursor 25 is located at the position of the direction indication 26, if the user depresses the determination switch 17, then the cursor modes can be alternately switched.

On the selecting screen of the alphabetical capital letters of "L" to "V" indicated in a display screen D18, when the cursor switch 16 is manipulated 5 times along the right direction, the cursor 25 is moved by 5 stages along the right direction, so that the alphabetical capital letter of "P" is selected, as shown in a display screen D19. When the determination switch 17 is depressed under this condition, the selection of the alphabetical capital letter of "P" is determined, so that one character area of the letter indication "P" within the register information display area. Since the above-described operation procedure is repeatedly carried out, a plurality of characters may be selected. In the case that the selected/determined character, or character string are defined to be entered, while the cursor switch 16 is manipulated so as to move the cursor 25 to the position of the definition item "KAKU". Then, since the determination switch 17 is depressed, the character information selected in the CPU 14 may be defined and then be registered.

As previously explained, in the above-described operation example of the selective calling receiver according to this embodiment mode of FIG. 5, in comparison with the first-explained comparison example shown in FIG. 4, in order that the selecting screen of the alphabetical capital letters "A" to "K" indicated in the display screen D14 is switched to the selecting screen of the alphabetical capital letters "L" to "V" shown in the display screen D18, the user is merely required to manipulate the cursor switch 16 and the determination switch 17, only 4 times in total. Furthermore, as indicated in the display screen D19, the user can move the cursor by manipulating the cursor switch 3 times until the display item "P" is selected.

As a consequence, when the move direction of the cursor can be changed by simply switching the cursor mode as explained in this embodiment mode, since the selection of the alphabetical capital letter of "P" can be completed by manipulating the switch only 9 times in total, the manipulation procedure can be largely reduced.

Now, a description will be made of process operations executed in the CPU 14 in such a case that the respective determination switch 17 and the cursor switch 16 are manipulated.

When the manipulation instruction issued by the determination switch 17 is entered to the CPU 14, a process operation shown in FIG. 7 is executed by this CPU 14. When the CPU 14 detects the manipulation input of the determination switch 17 (step S11), the CPU 14 judges as to whether or not the present position of the cursor 25 is located at a specific switching position (step S12). Now, when the cursor is located at this specific switching position, the CPU 14 switches the cursor mode at a step S13. On the other hand, when the cursor is not located at such a specific switching position, but located at a position of another item, the CPU 14 executes such an input process operation that the selected/determined/instructed information is inputted and the switching instruction of the operation mode is entered.

Also, when the manipulation instruction is entered from the cursor switch 16 to the CPU 14, this CPU 14 executes another process operation as indicated in FIG. 8. When the CPU 14 detects the manipulation input of the cursor switch 16 (step S21), the CPU 14 judges as to whether he move direction of the cursor corresponds to the right/left direction, or the upper/lower direction as the present cursor mode (step S22).

In other words, the CPU 14 judges as to whether the present cursor mode corresponds to the cursor movement to the right/left direction, or the scroll operation of the display item to the upper/lower direction. In this case, when the cursor mode corresponds to the cursor movement along the right/left direction, the CPU 14 moves the cursor to either the right direction or the left direction in response to the move instruction of the cursor switch 16 at a step S23. On the other hand, when the cursor mode corresponds to the scroll operation of the display item to the upper/lower direction, the CPU 14 scrolls the item to either the upper direction or the lower direction in response to the move instruction of the cursor switch 16 at a step S24.

Since the above-explained process operation is carried out by the CPU 14, the above-mentioned operations related to the switch manipulations and the cursor movement can be realized in the case that a plurality of functions are selected and a plurality of characters are inputted.

Figure 9A:
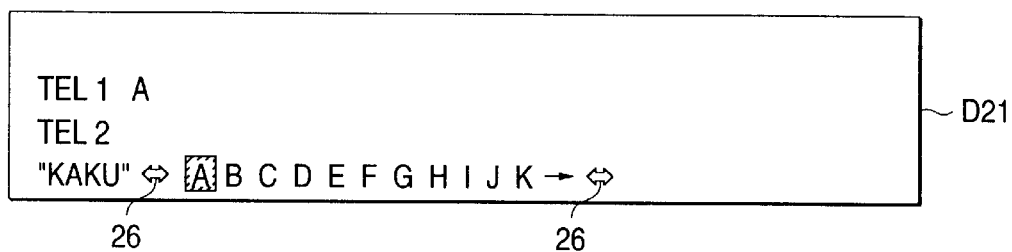
FIGS. 9A to 9C are explanatory diagram for explaining a modified example of the display screen.
Figure 9B:
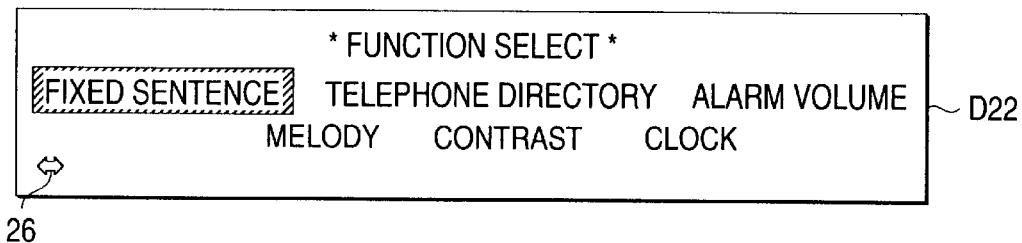
Figure 9C:

It should also be noted that the display screen is not limited only to the above-explained example shown in FIG. 5, but may be modified as modified examples shown in FIGS. 9A to 9C. That is, a display screen D21 of a first modified example indicated in FIG. 9A may be realized in such a manner that the direction indication 26 as the function item indicative of a specific switching position is provided not only at a left end of an item group of subject characters displayed in an array shape, but also at a right end thereof on a telephone directory registering screen. As previously explained, since such switching positions where the cursor mode can be switched are provided at both ends of the item group to be selected, a total number of switch manipulating procedures related to the cursor movement can be further reduced.

Also, a display screen D22 of a second modified example indicated in FIG. 9B is realized in such a manner that the direction indication 26 is employed on the function selecting screen similar to the telephone directory registering screen.

Thus, the user can readily recognize the move direction of the cursor by this direction indication 26. Also, in the case that a function item to be selected is located over plural screens, similar to the display screen of FIG. 5, the cursor is moved to the position of the direction indication 26 so as to switch the cursor mode. As a result, a total number of switch manipulation procedures related to the cursor movement can be reduced. It should also be understood that the cursor control operation according to this embodiment mode may be similarly applied not only to the above-explained display screens for inputting the characters and for selecting the function, but also such a display screen used to retrieve/display a registered content of a telephone directory, and another display screen used to select/display a received message.

Also, a display screen D23 of a third modified example indicated in FIG. 9C may be realized by indicating a selection screen of alphabetical small letters "a" to "k" as a telephone directory registering screen. On such a telephone directory registering screen, under the condition that the display item can be scrolled, the display item may be jump-scrolled in such a way that this display item may be moved among plural sorts of characters, for instance, alphabetical small letters "a" to "k", numerals "0" to "9", Hiragana-characters "a" to "ko", Katakana-characters "a" to "ko", and symbols "#", although the display item is sequentially scrolled from the selecting screen of the alphabetical capital letters "A" to "K" to the selecting screen of the alphabetical capital letters "L" to "V" as shown in the example of FIG. 5. Depending upon use condition, if such a jump-scroll operation is set as the scroll operation of the display item, then a total number of manipulating procedures when the function is selected and the character is entered can be reduced.

It should also be noted that the arrangement of the plural items which are selected to move the cursor is not limited to the above-described item arrangement in which the plural items are arranged in the straight-line manner. That is, the control operation of the cursor according to this embodiment mode may be similarly applied to the following item arrangements. For instance, in plural items which are arbitrarily arranged in plural arrays, the cursor is moved in one dimensional manner by manipulating the cursor switch in the cursor mode under initial state, and this cursor mode is switched to move the cursor along another direction.

As described above, in accordance with this embodiment mode, while the specific switching position is set on the display screen, the item corresponding to the switching position is added. At this specific switching position, the move modes of the cursor are changed with respect to the display item such as the cursor movement and the scroll operation of the display item. Thus, the move modes of the cursor can be changed as to the item of this switching position. As a consequence, a total number of the switch manipulation operations related to the cursor movement can be reduced, as compared with such a case that the cursor is moved only in the one dimensional manner with respect to a plurality of display items. As a consequence, the user can select the desirable items such as the function and the character without performing the switching manipulations many times. Moreover, the cumbersome operations of the switch manipulations required to select the desirable item can be avoided, and the operability of the wireless selective calling receiver can be improved. As a consequence, even in such a case that a total number of switches provided with an electronic appliance is limited, a cursor can be moved so as to readily select a desirable item with performing a small number of switch manipulation operations.

Also, in accordance with this embodiment mode, the direction indication may indicate either the cursor move direction when the cursor switch is manipulated or the scroll direction of the display item. As a consequence, the user can recognize the operative direction of the cursor switch and also can clearly grasp such a state that either the cursor or the displayed content is presently moved to which direction. As a result, the erroneous manipulation of the cursor switch can be avoided, and the operability can be furthermore improved, as compared with such a case that the cursor moving direction is not clearly pointed out.

As previously described in detail, according to the present invention, in the case that a plurality of items displayed on the display unit are selected so as to select a desirable function and/or input a character, when the cursor is located at such a specific switching position on the display unit, the move mode of the cursor on the display unit is switched in response to the operation input of the determination switch.

As a consequence, the cursor can be effectively moved to select a desirable display item from the plural display items. Therefore, it is possible to provide such an electronic appliance having a superior operability. That is, even when a small number of switches are employed in this electronic appliance, a desirable item can be quickly selected from a large number of items by a small number of switch manipulating procedures.

Also, in the display unit, such a direction indication is displayed. This direction indication indicates either the move direction of the cursor corresponding to the move mode of the cursor or the scroll direction of the display item. Then, this direction indication is switched in correspondence with the change in the cursor move modes. With employment of this direction indication, the user can readily grasp the present moved direction of the cursor when the user manipulates the switch of this cursor. Thus, since the cursor can be quickly moved along a desirable direction, the erroneous operation can be avoided and also the operability can be improved.

What is claimed is:

1. An electronic appliance comprising:

a display unit for displaying a cursor used to clearly point out a plurality of items and also an item selected from the plural items;

a cursor switch used to move/instruct the cursor;

a determination switch used to determine a selection/instruction of a display item corresponding to a position of the cursor; and control means connected to said display unit, said cursor switch, and said determination switch, for alternately switching between two move modes of the cursor on said display unit in response to the operation input of said determination switch when the cursor is located at a specific switching position on said display unit, wherein said display unit further displays a direction indication for indicating the move mode of the cursor, the direction indication being arranged as an item at the specific switching position.

2. The electronic appliance as claimed in claim 1, wherein said control means switches, as the move mode of the cursor, a move direction of the cursor with respect to the display item.

3. The electronic appliance as claimed in claim 1, wherein said control means switches, as the move mode of the cursor, a move direction of the cursor with respect to the display item to a right/left direction and an upper/lower direction.

4. The electronic appliance as claimed in claim 1, wherein said control means switches, as the move mode of the cursor, a move of the cursor to either a right/left direction or an upper/lower direction, and also a scroll operation of the display item along a direction perpendicular to the cursor move direction.

5. The electronic appliance as claimed in claim 1, wherein said cursor switch includes a rotary switch, said rotary switch issuing a move instruction of the cursor corresponding to the move mode of the cursor, or another move instruction used to scroll the display item in accordance with a rotating operation of said rotary switch.

6. A selective calling reception apparatus comprising:

a display unit for displaying a cursor used to clearly point out a plurality of characters or numerals, and a selected character or a selected numeral;

a cursor switch used to move/instruct the cursor;

a determination switch used to determine a selection/instruction of a display item corresponding to a position of the cursor; and control means connected to said display unit, said cursor switch, and said determination switch, for alternately switching between two move modes of the cursor on said display unit in response to the operation input of said determination switch, when the cursor is located at a specific switching position on the display unit, wherein said display unit further displays a direction indication for indicating the move mode of the cursor, the direction indication being arranged as an item at the specific switching position, such that a character is entered by the designation of the cursor.

7. A method for controlling operation of an electronic appliance comprising:

a displaying step for displaying on a display unit, a plurality of items and a cursor used to clearly point out an item selected from the plural items;

a cursor moving step for moving the cursor to a display item in response to a move instruction issued by a cursor switch;

a selecting/determining step for selecting/determining a display item corresponding to a position of the cursor in response to a selecting/determining instruction of a determination switch;

a move mode switching step for alternately switching between two move modes of the cursor on said display unit in response to an operation input of the determining step, when the cursor is located at a specific switching position on said display unit; and a direction displaying step for displaying on said display unit, a direction indication for indicating the move mode of the cursor, wherein the direction indication is arranged as an item at the specific switching position.

8. The method for controlling operation of an electronic appliance as claimed in claim 7, wherein in the move mode switching step, as the move mode of the cursor, a move direction of the cursor with respect to the display item is switched.

9. The method for controlling operation of an electronic appliance as claimed in claim 7, wherein in the move switching step, as the move mode of the cursor, a move direction of the cursor with respect to the display item is switched to a right/left direction and an upper/lower direction.

10. The method for controlling operation of an electronic appliance as claimed in claim 7, wherein in the move mode switching step, as the move mode of the cursor, a move of the cursor is switched to either a right/left direction or an upper/lower direction, and also a scroll operation of the display item along a direction perpendicular to the cursor move direction.

\* \* \* \* \*

UNITED STATES PATENT AND TRADEMARK OFFICE
CERTIFICATE OF CORRECTION

PATENT NO. : 6,654,002 B1
DATED : November 25, 2003
INVENTOR(S) : Yoichi Yamaki

It is certified that error appears in the above-identified patent and that said Letters Patent is hereby corrected as shown below:

Column 6,
Line 54, please delete "unit occupies", and insert therefor -- unit 15 occupies --.

Column 10,
Line 44, please delete "of the. direction", and insert therefor -- of the direction --.

Column 14,
Lines 53 and 58, please delete "at a specific", and insert therefor -- at a same specific --.

Column 15,
Lines 27-28, please delete "at a specific", and insert therefor -- at a same specific --.

Column 16,
Line 13, please delete "at a specific", and insert therefor -- at a same specific --.
Line 18, please delete "at the specific", and insert therefor -- at the same specific --.

Signed and Sealed this

Twenty-fifth Day of May, 2004

JON W. DUDAS
*Acting Director of the United States Patent and Trademark Office*